(12) United States Patent
Ina et al.

(10) Patent No.: US 6,355,075 B1
(45) Date of Patent: Mar. 12, 2002

(54) POLISHING COMPOSITION

(75) Inventors: Katsuyoshi Ina, Iwakura (JP); W. Scott Rader, Sherwood; David M. Shemo, Aloha, both of OR (US); Tetsuji Hori, Iwakura (JP)

(73) Assignees: Fujimi Incorporated, Nishikasugai-gun (JP); Fujimi America Inc., Wilsonville, OR (US)

( * ) Notice: Subject to any disclaimer, the term of this patent is extended or adjusted under 35 U.S.C. 154(b) by 0 days.

(21) Appl. No.: 09/502,336

(22) Filed: Feb. 11, 2000

(51) Int. Cl.$^7$ .............................. C09K 3/14; C09G 1/02
(52) U.S. Cl. ............................................. 51/308; 106/3
(58) Field of Search ........................ 51/308; 106/3; 438/692, 693; 252/79.1, 79.2, 79.4

(56) References Cited

U.S. PATENT DOCUMENTS

| | | |
|---|---|---|
| 5,575,885 A | 11/1996 | Hirabayashi et al. |
| 5,770,095 A | 6/1998 | Sasaki et al. |
| 5,897,375 A | 4/1999 | Watts et al. |
| 5,954,997 A * | 9/1999 | Kaufman et al. .......... 252/79.1 |
| 6,001,730 A | 12/1999 | Farkas et al. |
| 6,033,596 A * | 3/2000 | Kaufman et al. .......... 252/79.1 |
| 6,063,306 A * | 5/2000 | Kaufman et al. .......... 252/79.1 |

FOREIGN PATENT DOCUMENTS

| | | |
|---|---|---|
| EP | 0 747 939 A2 | 12/1996 |
| EP | 0 747 939 A3 | 12/1996 |
| EP | 0 846 742 | 6/1998 |
| WO | WO 99/61540 | 12/1999 |

* cited by examiner

Primary Examiner—Michael Marcheschi
(74) Attorney, Agent, or Firm—Oblon, Spivak, McClelland, Maier & Neustadt, P.C.

(57) ABSTRACT

A polishing composition comprising an abrasive, an anticorrosive, an oxidizing agent, an acid, a pH regulator and water and having a pH within a range of from 2 to 5, wherein the abrasive is colloidal silica or fumed silica, and its primary particle size is at most 20 nm.

13 Claims, 1 Drawing Sheet

A : $HCuO_2^- = CuO_2^{2-} + H^+$

Pourbaix Diagram: Cu-$H_2O$ system (25°C)

POLISHING COMPOSITION

BACKGROUND OF THE INVENTION

1. Field of the Invention

The present invention relates to a polishing composition to be used for polishing to planarize the surface of semiconductors. More particularly, it relates to a polishing composition useful for forming an excellent polished surface having an excellent planarization characteristic in polishing for planarization of the surface containing copper and tantalum or a tantalum-containing compound.

2. Discussion of Background

Progress of so-called high technology products including computers has been remarkable in recent years, and parts to be used for such products, such as ULSI, have been developed for high integration and high speed, year after year. Along with such progress, the design rule for semiconductor devices has been progressively refined year after year, the depth of focus in a process for producing devices tends to be shallow, and planarization required for the pattern-forming surface tends to be increasingly severe.

Further, various attempts have been made to improve the efficiency of the polishing process for semiconductor devices. For example, U.S. Pat. Nos. 5,391,258 and 5,476,606 disclose a composition for polishing a composite material comprising a metal and silica, particularly optimum selectivity for removal of the respective materials. In these patents, it is primarily intended to improve the selectivity for removal as between tungsten and silica by suppressing the rate of removal of silica.

Further, in recent years, to cope with an increase in resistance of the wiring due to refinement of the wiring, it has been studied to employ copper wiring instead of tungsten wiring and aluminum wiring, as the wiring material. By its nature, copper is hardly processable by etching, and accordingly, it requires the following process. Namely, after forming wiring grooves and perforations on an insulating layer, copper wirings are formed by sputtering or plating, and then an unnecessary copper layer deposited on the insulating layer is removed by chemical mechanical polishing (hereinafter referred to as CMP) which is a combination of mechanical polishing and chemical polishing.

However, in such a process, it may happen that copper atoms will diffuse into the insulating layer to deteriorate the device properties. Therefore, for the purpose of preventing diffusion of copper atoms, it has been proposed to provide a barrier layer on the insulating layer having wiring grooves or perforations formed. As a material for such a barrier layer, tantalum or tantalum nitride (hereinafter will generally be referred to as a tantalum-containing compound) is most suitable also from the viewpoint of the reliability of the device and is expected to be employed mostly in the future.

Accordingly, in such a CMP process for a semiconductor device containing such a copper layer and a tantalum-containing compound, firstly the copper layer as the outermost layer and then the tantalum-containing compound layer as the barrier layer, are polished, respectively, and polishing will be completed when it has reached the insulating layer of e.g. silicon dioxide or silicon trifluoride.

In such a CMP process for forming copper wirings, the following problems exist. Namely, the most serious problem may be such that the copper wirings after polishing are recessed as compared with the insulating layer (so-called dishing), and a portion where wirings are densely formed, is recessed as compared with other portions (so-called erosion). As an ideal process, it is desired that by using only one type of a polishing composition, the copper layer and the tantalum-containing compound layer are uniformly removed by polishing in a single polishing step, and polishing will be completed certainly when it has reached the insulating layer.

With respect to copper wirings in a multi-layer structure, practicality is desired with respect to all of the copper wiring layers. Namely, in the case of the uppermost layer, the thickness of the copper layer may be as thick as 2 µm (20,000 A), and in the case of the lowermost layer, the thickness of the copper layer may be at a level of 3,000 A. Whereas, the thicknesses of tantalum-containing compound layers as barrier layers are substantially the same for all layers at a level of from 200 to 500 A. Under these circumstances, it has been necessary to adopt separate processes for copper wirings in the upper layers and copper wirings in the lower layers.

Namely, for copper wirings in an upper layer, a conventional so-called two step polishing process is effective. In this process, firstly, in the first polishing, only the copper layer is polished at a high stock removal rate (usually at least 5,000 A/min). With respect to the terminal point of polishing, there are two methods, i.e. ① a method in which the polishing is terminated prior to reaching the barrier layer while the copper layer still remains in a thickness of from 1,000 to 2,000 A, and ② a method wherein the polishing is terminated when the copper layer to be removed, has all been removed and the barrier layer has been reached. In either method, the performance required for the first polishing is a high stock removal rate of the copper layer. On the other hand, the performance required for the second polishing is a high stock removal rate of the barrier layer and suppression of the stock removal rate of the insulating layer.

With respect to the polishing composition to be used in the first polishing of this two step polishing process, for example, JP-A-07-233485 discloses a polishing liquid for a copper type metal layer, which comprises at least one organic acid selected from the group consisting of aminoacetic acid and amidosulfuric acid, an oxidizing agent and water, and a method for producing a semiconductor device using such a polishing liquid.

If this polishing liquid is used for polishing a copper layer, a relatively high stock removal rate (usually about 5,000 A/min) is obtainable. It is believed that copper atoms on the copper layer surface become copper ions, and such copper ions are taken into a chelate compound, whereby a high stock removal rate can be obtained. Such a polishing composition is considered to be useful for the first polishing in forming copper wirings for the upper layer.

However, an ideal polishing composition which is useful for polishing a tantalum-containing compound layer i.e. for the second polishing, has not heretofore been proposed for the CMP process based on the above concept. Under these circumstances, the present inventors have previously proposed a polishing composition comprising an abrasive, an oxidizing agent capable of oxidizing tantalum, a reducing agent capable of reducing tantalum oxide and water, and a polishing method employing it (JP10-342106). Further, as improvements of this composition, the present inventors have proposed a polishing composition comprising an abrasive, oxalic acid, an ethylenediamine derivative, a benzotriazole derivative and water, and a polishing composition comprising an abrasive, oxalic acid, an ethylenediamine derivative, a benzotriazole derivative, hydrogen peroxide and water (JP11-266049). By this invention, a tantalum-containing compound can be polished certainly at a high stock removal rate, and these polishing compositions can be used for the second polishing.

When the above polishing compositions are used for polishing, a stock removal rate against a tantalum-containing compound can be accomplished to some extent. However, the ratio of the rate of removal of the tantalum-containing compound to the rate of removal of the insulating layer (hereinafter referred to simply as the selectivity ratio) is about 4 at best, whereby the process margin is narrow to certainly stop the polishing by the insulating layer, and consequently, the yield used to be low. Namely, it has been desired to develop a polishing composition which has a high stock removal rate against the barrier layer and which is capable of further suppressing the stock removal rate against the insulating layer.

Further, as mentioned above, in the case of the copper wirings in a lower layer, the thickness of the copper layer will be from 3,000 to 4,000 Å, and it is not only cumbersome but also uneconomical to carry out the polishing dividedly in two steps. Further, when the copper layer is polished with aminoacetic acid or amidosulfuric acid as disclosed in JP-A-07-233485, the stock removal rate against copper is too high, and it is difficult to adopt such a polishing agent from the viewpoint of the process administration. Accordingly, there has been a new demand such that the copper layer and the barrier layer be continuously polished, and the polishing be terminated by the insulating layer. Here, the performance required for the polishing composition is such that the rate of removal of the copper layer and the rate of removal of the barrier layer be substantially equal, while the rate of removal of the insulating layer be suppressed as far as possible. Namely, it is desired to develop a polishing composition whereby the copper layer and the barrier layer can be polished at a similar and high stock removal rate, and the stock removal rate against the insulating layer is further suppressed.

SUMMARY OF THE INVENTION

The present invention has been made to solve the above problems and to satisfy the above demand. Namely, it is an object of the present invention to provide a polishing composition which is capable of polishing copper and a tantalum-containing compound at a similar and high stock removal rate and providing a high selectivity ratio to the insulating layer.

Namely, to solve the above-described problems, the present invention provides a polishing composition comprising an abrasive, an anticorrosive, an oxidizing agent, an acid, a pH regulator and water and having a pH within a range of from 2 to 5, wherein the abrasive is colloidal silica or fumed silica, and its primary particle size is at most 20 nm.

In the above polishing composition, the content of transition metal impurities is preferably not higher than 10 ppm, the anticorrosive is preferably a benzotriazole derivative, particularly preferably benzotriazole, and the oxidizing agent is preferably hydrogen peroxide.

The content of the abrasive is preferably within a range of from 1 to 10 wt %, the content of the benzotriazole is preferably within a range of from 0.1 to 0.5 wt %, and the content of hydrogen peroxide is preferably within a range of from 1 to 5 wt %, based on the polishing composition, whereby the performance will be more effective.

Further, the pH of the polishing composition is adjusted within the above-mentioned range by the contents of the acid and the pH regulator.

DETAILED DESCRIPTION OF THE PREFERRED EMBODIMENTS

Figure 1:
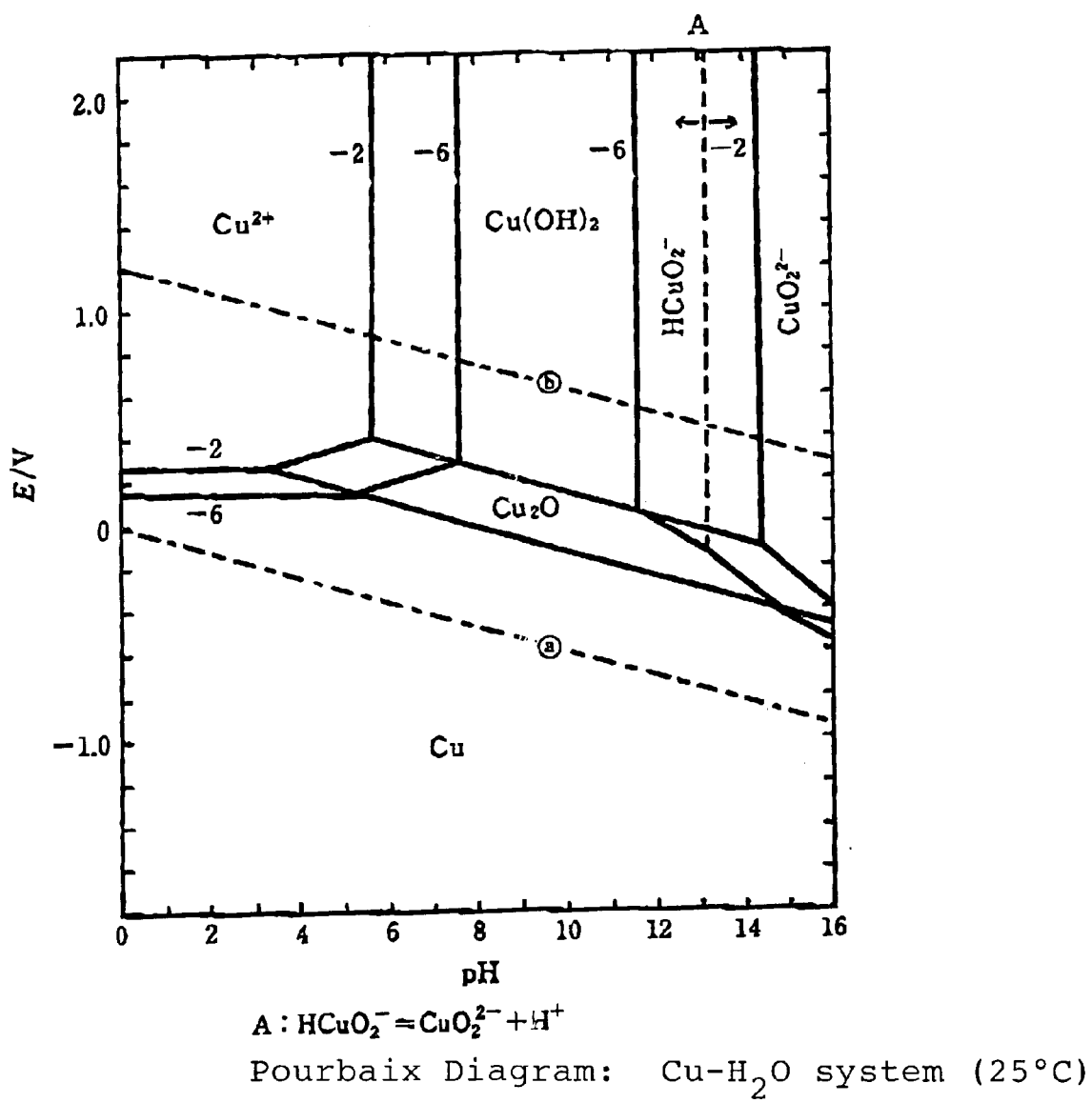
FIG. 1 is a Pourbaix diagram showing ionization of copper in terms of pH.

When the polishing composition of the present invention is employed, the polishing mechanism against a copper layer, a tantalum-containing compound layer and an insulating layer, is considered to be as follows. Firstly, against the copper layer or the tantalum-containing compound layer, an oxide film will be formed by the effect of the hydrogen peroxide as an oxidizing agent. Such an oxide film is believed to be relatively brittle as compared with a usual oxide film formed by natural oxidation, due to the strong oxidizing action of hydrogen peroxide. Then, the formed oxide film will be mechanically polished by colloidal silica or fumed silica as an abrasive. The polishing composition of the present invention is not of a type which forms a chelate with copper or tantalum to accelerate the polishing. The anticorrosive is incorporated to reduce the stock removal rate of copper to a desired level and to prevent corrosion of the copper layer surface after polishing. Incorporation of the anticorrosive gives no influence over the stock removal rate of the tantalum-containing compound. The pH is adjusted to accelerate oxidation of copper and the tantalum-containing compound and to create an optimum state for ionization of copper. Accordingly, as the pH increases, polishing of copper will be suppressed. On the other hand, components other than the abrasive (i.e. the anticorrosive, the hydrogen peroxide, the acid, the pH regulator and the water) give no influence over polishing the insulating layer. Accordingly, the stock removal rate against the insulating layer is determined solely depending upon the mechanical polishing ability of the abrasive. Suppression of the stock removal rate against the insulating layer can be realized by reducing the primary particle size as far as possible.

Further, the relation between the pH and polishing of copper will be described. FIG. 1 shows a Pourbaix diagram of copper. The polishing composition of the present invention contains the oxidizing agent, and the oxidation-reduction potential is located at the upper side in the figure, and the pH is within a range of from 2 to 5. According to this diagram, the copper in the polishing composition is in a stabilized state when it is in the form of copper ions. Accordingly, by the specified pH and the presence of the oxidizing agent, polishing of copper is accelerated. On the other hand, the anticorrosive which is an essential component of the present invention forms a stable protective film on the copper surface and thereby suppresses the polishing. By maintaining a balance between the polishing accelerating effect and the polishing suppressing effect, the stock removal rate of copper will be led to a proper level.

In the following description of the present invention, the first polishing step and the second polishing step will be referred to as "first polishing" and "second polishing", respectively, and the polishing ability in each polishing step will be referred to as "a stock removal rate". Further, "a barrier layer" is meant for "a tantalum-containing compound" in the present invention. Further, in the present invention, "a copper layer to be removed" or "a barrier layer to be removed" means a copper layer or a barrier layer which should not remain after completion of polishing to form copper wirings and means all the copper layer or the barrier layer other than one embedded in the wiring grooves or perforations. Further, "the insulating layer" means both of silicon dioxide and silicon oxyfluoride (SiOF). Further, "the selectivity ratio" is the ratio of the stock removal rate of the barrier layer to the stock removal rate of the insulating layer. For example, when and the stock removal rate of the insulating layer is 100, and the stock removal rate of the barrier layer is 500, the selectivity ratio will be 5.

The primary particle size used to define the abrasive of the present invention means both the primary particle size calculated from the specific surface area measured by a nitrogen adsorption method (BET method) and the primary particle size measured by an electron microscopic observation (SEM). The primary particle size by the BET method can be obtained by the formula of primary particle size= 2727/(specific surface area), when silicon dioxide is employed as the abrasive.

The abrasive contained in the present invention has a role as so-called abrasive grains and serves to perform mechanical polishing in the CMP process. In a conventional polishing composition to be used for the CMP process, the abrasive may usually be, for example, silicon dioxide, aluminum oxide, cerium oxide, silicon nitride, zirconium oxide, silicon carbide, or manganese dioxide. Among these, as an abrasive to be used in the present invention, it is required to be stable even in the presence of the anticorrosive, the oxidizing agent, the acid, the pH regulator, etc. Accordingly, it is preferred to employ silicon dioxide which is chemically stable against these components.

Further, among silicon dioxide, preferred is one which can readily be produced to have a primary particle size of at most 20 nm. Further, it is important that the content of transition metal impurities in the polishing composition is controlled to be not higher than 10 ppm. 20 As silicon dioxide satisfying these requirements, colloidal silica or fumed silica is preferably employed. There are two types of colloidal silica i.e. one obtained by particle growth of ultrafine particle colloidal silica obtained by ion exchange of sodium silicate, and the other produced by hydrolyzing an alkoxysilane with an acid or alkali (colloidal silica made by a so-called sol-gel method). Among these, the colloidal silica made by the sol-gel method is preferred, since a product of high purity is thereby available. On the other hand, the fumed silica can be produced by subjecting silicon tetrachloride, hydrogen and oxygen to a combustion reaction. This fumed silica has a three dimensional network structure, and to use it for the polishing composition of the present invention, such a network structure is crushed by a kneader or a disperser to obtain a colloidal dispersion.

As mentioned above, the abrasive in the present invention plays a role of mechanical polishing. With respect to the polishing power, it is important that the polishing power is high against the copper and the tantalum-containing compound, while the polishing power is suppressed against the insulating layer. More specifically, it is necessary that polishing is accelerated against copper oxide in the upper layer of the copper layer and tantalum oxide in the upper layer of the tantalum-containing compound layer, while the stock removal rate is suppressed against the insulating layer. For this purpose, the optimum primary particle size is at most 20 nm. If the primary particle size exceeds 20 nm, polishing against the insulating layer can not adequately be suppressed. As a result, the selectivity ratio tends to be small, such being undesirable. Further, the content of the abrasive is preferably within a range of from 1 to 10 wt % based on the polishing composition. If the content is less than 1 wt %, the mechanical polishing ability tends to be inadequate, whereby it tends to be difficult to obtain a sufficiently high stock removal rate against the tantalum-containing compound. On the other hand, if the content exceeds 10 wt %, the stock removal rate of the insulating layer tends to be large, whereby it tends to be difficult to obtain a sufficiently high selectivity ratio.

In the present invention, the anticorrosive is incorporated to reduce the stock removal rate of copper to a desired level and to prevent corrosion of the copper layer surface after polishing. The anticorrosive is preferably a benzotriazole derivative, more preferably benzotriazole. The action of the benzotriazole can be likewise provided by a benzotriazole derivative. The benzotriazole derivative may, for example, be benzotriazole, 2-methylbenzotriazole, 2-phenylbenzotriazole, 2-ethylbenzotriazole or 2-propylbenzotriazole. The content is preferably within a range of from 0.1 to 0.5 wt % based on the polishing composition. If the content is less than 0.1 wt %, formation of corrosion after polishing can not adequately be suppressed, although the copper may be polished at a very high stock removal rate. On the other hand, if it exceeds 0.5 wt %, benzotriazole itself tends to be hardly soluble in water, whereby it can not be completely dissolved or it is likely to precipitate at a low temperature, such being undesirable.

In the present invention, the oxidizing agent is incorporated to oxidize the copper and the tantalum-containing compound. As such an oxidizing agent, hydrogen peroxide is preferred. Hydrogen peroxide contains no metallic ions and thus is less likely to bring about a danger of contaminating semiconductor devices, and yet, it has an adequate oxidizing power to oxidize the copper layer and the tantalum-containing compound layer.

The content of hydrogen peroxide is preferably within a range of from 1 to 5 wt % based on the polishing composition. If the content is less than 1 wt %, it tends to be inadequate to oxidize the copper and the tantalum-containing compound. On the other hand, if it exceeds 5 wt %, the oxidizing power tends to be too high, and even after the polishing, the copper surface tends to be deeply oxidized, and the subsequent removal of the oxidized film (mainly by washing) tends to be difficult.

The content of transition metals allowable in the polishing composition of the present invention is at most 10 ppm, preferably at most 1 ppm, in a total amount of entire transition metals. Usually, transition metals have a plurality of valency states. For example, iron ions have bivalent and trivalent states, and copper ions have monovalent and bivalent states. Accordingly, if such transition metals are present in the polishing composition, they tend to bring about a decomposition reaction of hydrogen peroxide. Therefore, if transition metals are contained in the polishing composition, hydrogen peroxide will be gradually decomposed, and as a result, the stock removal rates of the copper and the tantalum-containing compound tend to decrease as the time passes. Whereas, alkali metals such as potassium, sodium and strontium, or alkaline earth metals such as calcium, magnesium and barium, do not have a plurality of valency states by their nature, and therefore they do not contribute to decomposition of hydrogen peroxide, and their contents are not particularly limited.

The acid to be used for the present invention may be any acid so long as it is useful for lowering the pH. Specifically, it may, for example, be an inorganic acid such as nitric acid, hydrochloric acid, sulfuric acid, carbonic acid or phosphoric acid, or an organic acid such as lactic acid, acetic acid, oxalic acid, citric acid, malic acid, succinic acid, butyric acid, malonic acid, glutaric acid, adipic acid, pimelic acid, benzoic acid, salicylic acid or phthalic acid. Among them, it is preferred to employ nitric acid, hydrochloric acid, sulfuric acid, lactic acid, acetic acid, oxalic acid, citric acid, malic acid, succinic acid, butyric acid or malonic acid, which is available in a relatively high purity at a low cost. However, hydrofluoric acid which is likely to dissolve the abrasive itself, is not desirable as an acid to be used for the present invention.

The content of the acid is preferably within a range of from 0.1 to 0.5 wt % based on the polishing composition. The acid lowers the pH as mentioned above, whereby the copper will be ionized. However, as the copper is ionized, the pH increases. Accordingly, taking into consideration the amount of copper ions formed during the polishing, the pH is preferably maintained from 2 to 5 even in the presence of copper ions. For this purpose, it is preferred that the polishing composition is provided with a buffering effect. Along this line, the content of the acid can be determined. Namely, taking into consideration the feeding rate of the polishing composition and the stock removal rate of copper, it is preferred to maintain the amount of the acid so that the pH is substantially maintained in the above-specified range even when all copper is ionized by polishing.

Now, reference is made to a specific example wherein using a 8 inch wafer, the copper layer is removed at a stock removal rate of 2,000 Å/min, while supplying the polishing composition at a feeding rate of 150 ml/min, whereby succinic acid is used as the acid.

In such a case, the amount of copper polished per minute will be polished thickness×wafer area×specific gravity of copper=$(0.2 \times 10^{-4}) \times (10 \times 10 \times 3.14) \times 8.93 = 0.06$ g. The molar amount will be (the amount of copper polished)/(atomic weight)=$0.06/63.55 = 0.00094$ mol.

Assuming that all of this copper will form a salt with succinic acid and taking into consideration the buffering effects, succinic acid (molecular weight 118) is incorporated to the polishing composition in a molar amount (0.0019 mol) corresponding to twice the molar amount of the above copper. In this case, the amount of succinic acid required will be the molecular weight of succinic acid×0.0019=0.22 g.

Taking into consideration the feeding rate of the polishing composition, the content of succinic acid required in the polishing composition will be 0.22/150=0.15 wt %.

Taking into consideration the above calculation and the molecular weights or equivalents of various acids, the content of the acid of the present invention is generally preferably at least 0.1 wt %.

On the other hand, if the acid is incorporated excessively, the acid may not be dissolved in the polishing composition or it is likely to precipitate at a low temperature, or such brings about an increase of the cost for treating the waste liquid. Accordingly, the content of the acid is usually preferably at most 0.5 wt %.

The pH regulator is incorporated to increase the pH once lowered by the above acid to a level within the pH range of the present invention. As the pH regulator, any pH regulator may be employed so long as such an object can be accomplished. Specifically, it may, for example, be potassium hydroxide, ammonium hydroxide, sodium hydroxide, hydroxylamine, trimethylamine hydroxide, ammonium carbonate, potassium carbonate, sodium carbonate, lithium hydroxide, barium hydroxide or strontium hydroxide. Among them, it is preferred to employ potassium hydroxide or ammonium hydroxide, which is available in a relatively high purity at a low cost.

The content of the pH regulator is such that the pH will be adjusted within a range of from 2 to 5 in the presence of the above acid. The specific range of the content will be determined depending upon the content and equivalent of the acid.

By using the polishing composition of the present invention, the copper and the barrier layer can be polished substantially at the same level of the stock removal rate, and a polishing characteristic such that the insulating layer is not substantially polished, can be attained. Specifically, the copper and the barrier layer can be polished at a stock removal rate of from 500 to 2,000 Å/min, while the stock removal rate against the insulating layer can be suppressed to a level of from 0 to 50 Å/min. Such adjustment of the stock removal rate can be freely controlled by adjusting the setting of the polishing machine itself. Namely, it can be controlled by setting the polishing pressure and the linear velocity depending upon the rotational speed of the carrier and the plate. Generally, the stock removal rate is univocally determined by the following formula:

Stock removal rate polishing pressure×linear velocity

The polishing composition of the present invention is used for first polishing or second polishing in a process for polishing copper and a tantalum-containing compound in the production of a semiconductor device containing copper wirings.

When it is used for first polishing, it is effective, for example, in a case where the thickness of the copper layer is at most 5,000 Å (mainly a lower wiring layer). On the other hand, when it is used for second polishing, it is effective, for example, in a case where the thickness of the copper layer is at least 5,000 Å (mainly an upper wiring layer). More specifically, for example, in a case where the thickness of the copper layer is 4,000 Å, if the stock removal rate against copper is set to be 2,000 Å/min, polishing can be ideally completed in about 2 minutes, and even if non-uniformities (including both non-uniformity in polishing and non-uniformity in the layer thickness) exist in the plane, all the copper layer and the tantalum-containing compound to be removed, can be polished by polishing for about 3 minutes, and yet, polishing of the insulating layer can be suppressed to a level of at most 100 Å even at the portion where the polishing is most advanced. Further, in a case where the thickness of the copper layer is 1 µm (10,000 Å), if only copper is polished for 2 minutes at a stock removal rate of 5,000 Å/min, by the first polishing, using, for example, a polishing composition (for example, aminoacetic acid) showing a chelate effect against copper, and then, the remaining copper layer and the barrier layer are polished by the second polishing employing the polishing composition of the present invention by setting the stock removal rates of the copper layer and the barrier layer, for example, at a level of 800 Å/min, a substantially flat polished surface can be obtained by polishing for about one minute.

Further, as the technology progresses in future, there will be a development of a semiconductor device comprising a combination of copper wirings and a so-called Low-k material (an insulating material having a dielectric constant of from 1.5 to 2.5). Here, a silica layer or a silicon trifluoride layer having a thickness of about 1,000 A will be formed on a Low-k layer. (The silica or silicon trifluoride layer formed on this Low-k layer is called usually as a cap material.) The performance required for such a CMP process is high selectivity between the cap material and the barrier material. The polishing composition of the present invention is expected to be very effective, since the selectivity ratio can be at least 50 by optimizing the pH and the oxidizing agent.

In the present invention, even when an acid not having two carboxyl groups, is used as the acid to control the pH, its effects are distinct. Thus, the present invention is distinguished from U.S. Pat. Nos. 5,391,258 and 5,476,606. Further, the effects of the present invention are observed by the use of succinic acid which showed no effects in U.S. Pat. Nos. 5,391,258 and 5,476,606. Still further, even when oxalic acid (an acid which does not suppress but rather accelerates the stock removal rate of silica) is employed, the stock removal rate of the insulating layer can perfectly be suppressed under the conditions of the abrasive and pH specified by the present invention.

The polishing composition of the present invention is usually prepared by mixing and dispersing in water the above-mentioned respective components, i.e. the abrasive, the anticorrosive, the oxidizing agent, the acid and the pH regulator. The abrasive will be uniformly dispersed in this composition to form a suspension, and other components will be dissolved in water. An optional method may be employed to mix such a composition. For example, it may be stirred by a vane-type stirrer, or it may be dispersed by ultrasonic wave dispersion. When hydrogen peroxide is used as an oxidizing agent, it is likely to be decomposed during transportation or storage. Therefore, it is preferred to add a predetermined amount of hydrogen peroxide to obtain a polishing composition immediately prior to the actual use.

Further, the polishing composition of the present invention may be prepared, stored or transported in the form of a stock solution having a relatively high concentration, so that it may be diluted for use at the time of actual polishing operation. The above-mentioned preferred range for the concentration is one for the actual polishing operation. Needless to say, in the case of adopting such a method of use, the stock solution during the storage or transportation is a solution having a higher concentration.

The contents of various components as defined for the composition of the present invention represent the contents in the composition finally prepared for polishing. Namely, when hydrogen peroxide is added for incorporation of an oxidizing agent immediately prior to the polishing, the various contents are defined as a composition having such an additional amount added.

Likewise, the contents in the compositions shown in Examples given hereinafter, represent the contents in the final compositions immediately prior to the polishing operations.

Now, the practical embodiments of the present invention will be described in detail with reference to Examples. However, it should be understood that the present invention is by no means restricted to such specific Examples.

EXAMPLE 1

As an abrasive, colloidal silica (primary particle size: 13 nm) prepared by a sol-gel method, was used, and its content was adjusted to be 5 wt %. Further, as an anticorrosive, benzotriazole was used, and its content was adjusted to be 0.3 wt %. Further, an acid was mixed in a predetermined amount, as identified in Table 1, and then, potassium hydroxide was added to adjust the pH, so that the pH would be within a range of from 2 to 5. Then, as an oxidizing agent, hydrogen peroxide was used, and its content was adjusted to be 3 wt %. As such hydrogen peroxide, a commercially available 31% aqueous solution was used, and it was mixed immediately prior to polishing. The contents of transition metals in the polishing compositions thus prepared, were measured by ICP-MS method, whereby the total transition metal contents in all polishing compositions were not higher than 0.6 ppm even with the maximum value.

As objects to be polished, a wafer having a copper layer formed in a thickness of 10,000 Å by electro plating, a wafer having a tantalum nitride layer formed in a thickness of 2,000 Å by sputtering and a wafer having a silica layer (TEOS layer) formed in a thickness of 10,000 Å by CVD, were cut into a size of 3×3 cm, and the layer-formed side of each wafer was polished.

The polishing method was as follows.
Polishing Conditions
　Polishing machine: Table Top Polisher (manufactured by Engis Co.
　Polishing pad: IC-1000 (manufactured by Rodel Nitta Co.)
　Polishing time: 1 min
　Platen rotational speed: 50 rpm
　Carrier rotational speed: 50 rpm
　Down force: 2.6 psi (about 185 g/cm$^2$)
　Polishing composition feeding rate: 50 ml/l After polishing, the wafer was sequentially washed and dried, and the stock removal rate was obtained by the following method.
Stock removal rates of the copper layer and the tantalum nitride layer:
　Resistance type thickness measuring apparatus RS-35C (manufactured by KLA-Tencor Co.)
　Stock removal rate of the silica layer:
　Optical thickness measuring meter Lambda-Å (manufactured by Dainippon Screen K.K.)
Measuring method: Measured at 5 points in a wafer. The stock removal rate was calculated from the difference in the layer thickness as between before and after polishing.

Then, the copper layer wafer after polishing was observed by an optical microscope. The results are shown in Table 1 together with the composition of the polishing composition. Evaluation in Table 1 was made in accordance with the following standards.
Evaluation Standards
　◎: No corrosion of copper observed.
　○: Very small corrosions with a diameter of not more than 0.5 μm observed.
　X: Corrosions with a diameter exceeding 0.5 μm observed.

TABLE 1

|  |  | Acid | | pH regulator | pH | Stock removal rate (Å/min) | | | Surface state |
|---|---|---|---|---|---|---|---|---|---|
|  |  | Type | Content (wt %) |  |  | Copper | Tantalum nitride | Silica |  |
| Present invention | No. 1 | Oxalic acid | 0.1 | KOH | 3.4 | 1126 | 880 | 23 | ◎ |
| Present invention | No. 2 | Nitric acid | 0.5 | KOH | 2.4 | 550 | 861 | 23 | ◎ |
| Present invention | No. 3 | Lactic acid | 0.5 | KOH | 3.2 | 755 | 818 | 21 | ◎ |
| Present invention | No. 4 | Acetic acid | 0.5 | KOH | 3.6 | 412 | 530 | 21 | ◎ |
| Present invention | No. 5 | Succinic acid | 0.5 | KOH | 2.9 | 434 | 859 | 25 | ◎ |
| Present invention | No. 6 | Hydrochloric acid | 0.5 | KOH | 3.6 | 416 | 892 | 22 | ◎ |
| Present invention | No. 7 | Citric acid | 0.5 | KOH | 4.2 | 840 | 929 | 20 | ◎ |
| Comparative Example | No. 8 | Nil |  | Nil | 7.1 | 87 | 61 | 8 | ◎ |

As shown in Table 1, with the polishing composition of No. 8 where the pH was not adjusted, the copper layer and the tantalum nitride layer were not substantially polished. With other polishing compositions, the effects were distinct and the polishing performance and the state of the copper surface were evaluated.

TABLE 2

| | | Primary particle size of abrasive (nm) | Content of abrasive (wt %) | Benzotriazole (wt %) | Hydrogen peroxide (wt %) | pH | Copper (A/min) | Tantalum nitride (A/min) | Silica layer (A/min) | Surface state |
|---|---|---|---|---|---|---|---|---|---|---|
| Comparative Example | No. 9 | 30 | 5 | 0.3 | 3 | 3.4 | 700 | 620 | 340 | ⊚ |
| Present invention | No. 10 | 13 | 5 | 0.3 | 3 | 3.3 | 920 | 850 | 20 | ⊚ |
| Present invention | No. 11 | 5 | 5 | 0.3 | 3 | 3.4 | 900 | 900 | 12 | ⊚ |
| Present invention | No. 12 | 14 | 0.5 | 0.35 | 3 | 3.4 | 456 | 446 | 17 | ⊚ |
| Present invention | No. 13 | 14 | 1 | 0.35 | 3 | 3.4 | 788 | 764 | 31 | ⊚ |
| Present invention | No. 14 | 14 | 10 | 0.35 | 3 | 3.4 | 1426 | 959 | 130 | ⊚ |
| Present invention | No. 15 | 14 | 12 | 0.35 | 3 | 3.4 | 1506 | 1022 | 212 | ⊚ |
| Present invention | No. 16 | 14 | 5 | 0.1 | 3 | 3.4 | 544 | 939 | 88 | ○ |
| Present invention | No. 17 | 14 | 5 | 0.2 | 3 | 3.4 | 324 | 911 | 82 | ⊚ |
| Present invention | No. 18 | 14 | 5 | 0.4 | 3 | 3.4 | 416 | 916 | 66 | ⊚ |
| Present invention | No. 19 | 14 | 5 | 0.5 | 3 | 3.4 | 412 | 857 | 47 | ⊚ |
| Present invention | No. 20 | 14 | 5 | 0.35 | 0.5 | 3.4 | 346 | 885 | 83 | ⊚ |
| Present invention | No. 21 | 14 | 5 | 0.35 | 1 | 3.4 | 430 | 916 | 89 | ⊚ |
| Present invention | No. 22 | 14 | 5 | 0.35 | 5 | 3.4 | 1070 | 921 | 95 | ⊚ |
| Present invention | No. 23 | 14 | 5 | 0.35 | 7 | 3.4 | 918 | 810 | 96 | ⊚ | with respect to all acids including citric acid (No. 7). The selectivity ratio (tantalum nitride layer removal rate/silica layer removal rate) was at a level of from 20 to 50. With this selectivity, the process margin will be wide, and improvement in the yield can be expected. Further, the selectivity ratio of copper (copper layer removal rate/tantalum nitride layer removal rate) was within a range of from 0.4 to 1.3. Within this range, when such a polishing composition is to be used for first polishing, one having a selectivity close to 1 can be used, and when it is to be used for second polishing, a suitable polishing composition can be selected for use depending upon the dishing or erosion after the first polishing. Further, good polishing performance was obtained when the pH was controlled within a range of from 2 to 5.

COMPARATIVE EXAMPLE 1

In the polishing composition of No. 3, iron nitrate was intentionally mixed to obtain a polishing composition having an iron concentration of 20 ppm. As a result, immediately after the addition of iron nitrate, the polishing performance similar to one identified in Table 1 was observed, but when measured again one day later, the stock removal rates of copper and tantalum nitride were found to have decreased to a level of 100 A/min. It is considered that hydrogen peroxide was decomposed by the inclusion of iron ions.

EXAMPLE 2

Various polishing compositions were prepared by changing the primary particle size of the abrasive, the content of the abrasive, the content of benzotriazole and the content of hydrogen peroxide as shown in Table 2. Then, the polishing tests were carried out in the same manner as in Example 1, No. 9–11: As an acid, citric acid (0.5 wt %) was used, and as a pH regulator, potassium hydroxide was used.
No. 12–15, No. 20–23: As an acid, lactic acid (0.5 wt %) was used, and as a pH regulator, potassium hydroxide was used.
No. 16–19: As an acid, nitric acid (0.5 wt %) was used, and as a pH regulator, potassium hydroxide was used.

The polishing composition of the present invention provides a high stock removal rate against a copper layer and a tantalum-containing compound layer and a low stock removal rate against an insulating layer in a CPM process for the production of a semiconductor device containing a copper layer and a tantalum-containing compound layer. Thus, the present invention provides a polishing composition suitable for first or second polishing.

What is claimed is:

1. A polishing composition comprising an abrasive, an anticorrosive, an oxidizing agent, an acid, a pH regulator and water and having a pH within a range of from 2 to 5, wherein the abrasive is colloidal silica and the primary particle size of the colloidal silica is at most 20 nm.

2. The polishing composition according to claim 1 containing not higher than 10 ppm of transition metal impurities.

3. The polishing composition according to claim 1, wherein the content of the abrasive is within a range of from 1 to 10 wt % based on the polishing composition.

4. The polishing composition according to claim 1, wherein the anticorrosive is a benzotriazole derivative.

5. The polishing composition according to claim 4, wherein the benzotriazole derivative is benzotriazole, and its content is within a range of from 0.1 to 0.5 wt % based on the polishing composition.

6. The polishing composition according to claim 1, wherein the oxidizing agent is hydrogen peroxide.

7. The polishing composition according to claim 6, wherein the content of the hydrogen peroxide is within a range of from 1 to 5 wt % based on the polishing composition.

8. The polishing composition according to claim 1, wherein the acid is at least one member selected from the group consisting of nitric acid, hydrochloric acid, sulfuric acid, lactic acid, acetic acid, oxalic acid, citric acid, malic acid, succinic acid, butyric acid and malonic acid.

9. The polishing composition according to claim 1, wherein the content of the acid is within a range of from 0.1 to 0.5 wt % based on the polishing composition.

10. The polishing composition according to claim 1, wherein the pH regulator is at least one member selected from the group consisting of potassium hydroxide and ammonium hydroxide.

11. The polising composition according to claim 1, wherein the content of the pH regulator is at a level to bring the pH of the composition within a range of from 2 to 5 in the presence of the acid.

12. The polishing composition according to claim 1 where the colloidal silica is a colloidal silica produced by hydrolyzing an alkoxysilane with an acid or alkali.

13. The polishing composition according to claim 4 where the colloidal silica is a colloidal silica produced by hydrolyzing an alkoxysilane with an acid or alkali, the content of the abrasive is within the range of 1 to 10 wt. % based on the polishing composition and wherein the content of the pH regulator is at a level to bring the pH of the composition within a range of from 2 to 5 in the presence of the acid.

* * * * *